(12) United States Patent
Peng et al.

(10) Patent No.: US 10,778,490 B2
(45) Date of Patent: Sep. 15, 2020

(54) REFERENCE SIGNAL TRANSMISSION METHOD AND APPARATUS

(71) Applicant: HUAWEI TECHNOLOGIES CO., LTD., Shenzhen (CN)

(72) Inventors: Jinlin Peng, Shanghai (CN); Zongjie Wang, Shenzhen (CN); Mengying Ding, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/370,963

(22) Filed: Mar. 30, 2019

(65) Prior Publication Data

US 2019/0229962 A1   Jul. 25, 2019

Related U.S. Application Data

(63) Continuation of application No. PCT/CN2017/103993, filed on Sep. 28, 2017.

(30) Foreign Application Priority Data

Sep. 30, 2016   (CN) .......................... 2016 1 0877218

(51) Int. Cl.
*H04K 1/10* (2006.01)
*H04L 27/26* (2006.01)
*H04L 5/00* (2006.01)

(52) U.S. Cl.
CPC .......... *H04L 27/262* (2013.01); *H04L 5/0007* (2013.01); *H04L 5/0053* (2013.01);
(Continued)

(58) Field of Classification Search
CPC ... H04L 27/262; H04L 27/26; H04L 27/2613; H04L 5/0007; H04L 5/0053; H04L 27/2617; H04L 27/2621; H04L 27/261
See application file for complete search history.

(56) References Cited

U.S. PATENT DOCUMENTS

2004/0008616 A1   1/2004   Jung et al.
2005/0201334 A1   9/2005   Roh et al.
(Continued)

FOREIGN PATENT DOCUMENTS

CN   1666452 A   9/2005
CN   1980212 A   6/2007
(Continued)

OTHER PUBLICATIONS

Ericsson,"Concatenated block RS design",3GPP TSG-RAN WG1#86 R1-167080,Gothenburg, Sweden Aug. 22-26, 2016,total 3 pages.

*Primary Examiner* — Dhaval V Patel
(74) *Attorney, Agent, or Firm* — Kilpatrick Townsend & Stockton LLP (57) ABSTRACT

Embodiments of the present invention disclose a reference signal transmission method. A transmitting apparatus multiplies M first symbol sequences by M coefficients respectively to obtain M second symbol sequences, where M is a positive integer greater than 1, the symbol sequence includes L symbols, L is a positive integer greater than 1, and the M coefficients each have a magnitude of 1. The transmitting apparatus maps the M second symbol sequences onto a first time-frequency resource to obtain a frequency domain signal. The transmitting apparatus performs an IFFT operation on the frequency domain signal to obtain a time domain signal. And the transmitting apparatus sends the time domain signal.

19 Claims, 7 Drawing Sheets

(52) U.S. Cl.
CPC .......... *H04L 27/26* (2013.01); *H04L 27/2613* (2013.01); *H04L 27/2617* (2013.01)

(56)  References Cited

U.S. PATENT DOCUMENTS

| | | |
|---|---|---|
| 2011/0211655 A1 | 9/2011 | Wang et al. |
| 2012/0322492 A1* | 12/2012 | Koo ................. H04B 7/022 |
| | | 455/517 |
| 2014/0153507 A1* | 6/2014 | Yang ............... H04L 27/2602 |
| | | 370/329 |
| 2016/0337101 A1 | 11/2016 | Gao et al. |
| 2018/0063819 A1* | 3/2018 | Saito ................... H04B 7/04 |

FOREIGN PATENT DOCUMENTS

| | | | |
|---|---|---|---|
| CN | 101043235 | A | 9/2007 |
| CN | 101340417 | A | 1/2009 |
| CN | 101374125 | A | 2/2009 |
| CN | 101442336 | A | 5/2009 |
| CN | 101729477 | A | 6/2010 |
| CN | 102546516 | A | 7/2012 |
| CN | 102932289 | A | 2/2013 |
| CN | 104796218 | A | 7/2015 |
| CN | 105681241 | A | 6/2016 |
| EP | 2056615 | A1 | 5/2009 |
| EP | 2685662 | A1 | 1/2014 |
| EP | 2698929 | A1 | 2/2014 |
| WO | 2016043640 | A1 | 3/2016 |

* cited by examiner

FIG. 1

| Block quantity (M) | Phase rotation coefficients ($b_0, b_1, ... b_{M-1}$) |
|---|---|
| 2 | 1, 1 |
| 3 | 1, i, 1 |
| 4 | 1, –i, –i, 1 |
| 5 | 1, 1, 1, –1, 1 |
| 6 | 1, i, i, i, 1, –i |
| 7 | 1, i, –1, i, –1, i, 1 |
| 8 | 1, –1, i, –1, –i, –i, –1, –1 |
| 9 | 1, 1, –i, –i, 1, 1, –1, 1, –1 |
| 10 | 1, i, 1, i, i, –1, 1, 1, –i, –1 |
| 11 | 1, –1, 1, 1, –1, 1, 1, 1, –1, –1, –1 |
| 12 | 1, –1, 1, –1, –1, –1, –1, –1, 1, 1, –1, –1 |
| 13 | 1, –1, 1, –1, 1, 1, –1, –1, 1, 1, 1, 1, 1 |
| 14 | 1, –1, –1, 1, –1, 1, –1, –1, –1, 1, 1, 1, 1, 1 |
| 15 | 1, –1, 1, –1, 1, 1, –1, –1, 1, 1, –1, –1, –1, –1, –1 |
| 16 | 1, –1, 1, –1, –1, 1, 1, –1, –1, –1, 1, 1, 1, 1, 1, 1 |
| 17 | 1, –1, –1, 1, 1, –1, 1, –1, 1, 1, 1, 1, 1, 1, –1, –1, –1 |
| 18 | 1, –1, –1, 1, 1, –1, –1, 1, –1, 1, –1, –1, –1, –1, 1, 1, 1, 1 |
| 19 | 1, –1, –1, –1, 1, 1, 1, –1, 1, –1, –1, –1, –1, –1, 1, –1, –1, 1 |
| 20 | 1, –1, –1, 1, 1, 1, –1, –1, 1, –1, 1, 1, 1, –1, 1, –1, –1, –1, –1, –1 |
| 21 | 1, –1, –1, 1, –1, 1, –1, 1, –1, –1, 1, 1, –1, –1, –1, –1, –1, –1, –1, 1, 1 |
| 22 | 1, 1, 1, –1, –1, –1, 1, 1, –1, 1, –1, 1, –1, –1, 1, 1, –1, 1, 1, 1, 1, 1 |
| 23 | 1, –1, 1, –1, –1, –1, –1, –1, –1, –1, 1, 1, –1, 1, 1, –1, –1, –1, 1, 1, 1, –1, –1 |
| 24 | 1, –1, –1, 1, 1, –1, 1, 1, –1, 1, –1, 1, –1, –1, –1, –1, –1, –1, 1, 1, 1, –1, –1 |
| 25 | 1, –1, –1, –1, 1, 1, –1, 1, 1, –1, 1, –1, 1, –1, –1, –1, –1, –1, –1, 1, 1, 1, –1, –1, –1 |

| 1.1 |
| 1.2 |
| ... |
| ... |
| 2.2 |
| 2.3 |
| ... |
| ... |
| 4.2 |
| 4.3 |
| 4.4 |

6B

| 1.1 |
| 2.1 |
| ... |
| ... |
| 2.3 |
| 3.3 |
| ... |
| ... |
| 2.4 |
| 3.4 |
| 4.4 |

6C

| 1.1 |
| 1.2 |
| 1.3 |
| 1.4 |
| ... |
| ... |
| 2.1 |
| 2.2 |
| ... |
| ... |
| 3.3 |
| 3.4 |
| ... |
| ... |
| 4.1 |
| 4.2 |
| 4.3 |
| 4.4 |

REFERENCE SIGNAL TRANSMISSION METHOD AND APPARATUS

CROSS-REFERENCE TO RELATED APPLICATIONS

This application is a continuation of International Application No. PCT/CN2017/103993, filed on Sep. 28, 2017, which claims priority to Chinese Patent Application No. 201610877218.4, filed on Sep. 30, 2016. The disclosures of the aforementioned applications are hereby incorporated by reference in their entireties.

TECHNICAL FIELD

The present invention relates to the field of communications technologies, and in particular, to a reference signal transmission method and an apparatus.

BACKGROUND

A reference signal (RS), also referred to as a pilot signal, is a known signal provided by a transmit end to a receiving apparatus. The reference signal is mainly used for channel estimation or channel measurement.

In the prior art, common methods for ensuring orthogonality of RSs of a same type or different types that are from a same transmitting apparatus or different transmitting apparatuses include time division, frequency division, and code division. For example, to ensure RS orthogonality for a plurality of user equipments (UE) in uplink multi-user multiple-input multiple-output (MU-MIMO) in a Long Term Evolution (LTE) system, time-frequency resources used by a plurality of paired UEs in MU-MIMO fully overlap, and do not overlap with a time-frequency resource used by another UE at all. When used resources do not overlap at all, the time division or frequency division manner is used to ensure that UEs do not interfere with each other. Alternatively, when used resources fully overlap, an orthogonal sequence or orthogonal cover code (OCC) manner is used to ensure orthogonality of RSs of different UEs.

Ericsson proposed a technical solution of block transmission in a contribution R1-167080 of the 3rd Generation Partnership Project (3GPP) standards organization. In the technical solution, an RS of each UE is split into a plurality of blocks, and orthogonality of RSs of different UEs is ensured within a block, so as to ensure overall orthogonality. The present invention is intended to reduce a peak-to-average power ratio (PAPR) and a raw cubic metric (RCM) after an RS is split into a plurality of blocks.

SUMMARY

Embodiments of the present invention provide a reference signal transmission method and an apparatus, to effectively reduce a PAPR/an RCM during transmission of a reference signal while ensuring orthogonality of the reference signal.

According to a first aspect, a specific embodiment of the present invention provides a reference signal transmission method. A transmitting apparatus multiplies M first symbol sequences by M coefficients respectively to obtain M second symbol sequences, where M is a positive integer greater than 1, the symbol sequence includes L symbols, L is a positive integer greater than 1, and the M coefficients each have a magnitude of 1; maps the M second symbol sequences onto a first time-frequency resource to obtain a frequency domain signal; performs an inverse fast Fourier transform IFFT operation on the frequency domain signal to obtain a time domain signal; and sends the time domain signal. A reference signal is split into a plurality of symbol sequences, and phase rotation is performed for the plurality of symbol sequences. This effectively reduces a PAPR/an RCM during transmission of the reference signal while ensuring orthogonality of the reference signal.

In a possible design, the method further includes: determining the M coefficients.

In a possible design, the determining the M coefficients specifically includes: determining the M coefficients based on at least one of a value of L, a value of M, value information of sequences in the M first symbol sequences, and information about the first time-frequency resource. The M coefficients are determined in a plurality of manners, so as to reduce the PAPR/RCM during transmission of the reference signal.

In a possible design, the method further includes: sending a control message, where the control message includes related information of the M coefficients, and the related information of the M coefficients is used by a receiving apparatus to determine the M coefficients. The control message is sent to the receiving apparatus, so that the receiving apparatus can conveniently determine a phase rotation coefficient.

In a possible design, the related information of the M coefficients includes a coefficient index value; or at least one of the value of L, the value of M, and the value information of the sequences in the M first symbol sequences. The receiving apparatus determines the phase rotation coefficient in a plurality of manners.

In a possible design, the control message further includes related information of the first time-frequency resource, and the related information of the first time-frequency resource is used to indicate a time-frequency location of the first time-frequency resource. The related information of the first time-frequency resource is sent to the receiving apparatus, so that the receiving apparatus can determine the phase rotation coefficient.

In a possible design, the mapping the M second symbol sequences onto a first time-frequency resource specifically includes at least one of the following mapping manners: sequentially mapping the symbols in the M second symbol sequences onto resource elements RE of consecutive frequencies; or mapping the symbols in the M second symbol sequences onto REs of consecutive frequencies in an interleaving manner; or mapping the symbols in the M second symbol sequences onto REs of consecutive frequencies in a spaced manner, where the spaced manner specifically includes mapping different symbols in a same second symbol sequence onto REs of consecutive frequencies, and mapping different second symbol sequences onto REs of frequencies with a fixed spacing. Therefore, the second symbol sequences are mapped onto the first time-frequency resource in a plurality of manners.

In a possible design, the value of L is an integer multiple of a quantity of resource elements RE included in a resource block RB.

According to a second aspect, a specific embodiment of the present invention provides a reference signal transmission method. A receiving apparatus receives a time domain signal; performs a fast Fourier transform FFT operation on the time domain signal to obtain a frequency domain signal; determines a time-frequency location of a reference signal; splits the received reference signal into blocks based on a length of L to obtain N third symbol sequences, where a length of each symbol sequence in the N third symbol sequences is L, and N and L both are positive integers greater than 1; divides the N third symbol sequences by N coefficients respectively to obtain N fourth symbol sequences, where the N coefficients each have a magnitude of 1; and perform at least one operation of channel estimation and channel quality measurement by using the N fourth symbol sequences. The reference signal is split into a plurality of symbol sequences, and phase rotation is performed for the plurality of symbol sequences. This effectively reduces a PAPR/an RCM during transmission of the reference signal while ensuring orthogonality of the reference signal.

In a possible design, the method further includes: determining the N coefficients.

In a possible design, the determining the N coefficients includes: determining M coefficients, where M is a quantity of second symbol sequences with a length of L that are transmitted by a transmit end, M is a positive integer greater than or equal to N, and N second symbol sequences in the M second symbol sequences are sent to the receiving device; and determining the N coefficients based on the M coefficients and locations of the N second symbol sequences in the M second symbol sequences.

In a possible design, the determining M coefficients specifically includes: determining the M coefficients based on a coefficient index value; or determining the M coefficients based on at least one of a value of L, a value of M, value information of sequences in the M symbol sequences sent by the transmit end, and time-frequency resource information of the M symbol sequences. The M coefficients are determined in a plurality of manners.

In a possible design, the method further includes: receiving a control message, where the control message includes related information of the M coefficients. The control message is sent to the receiving apparatus, so that the receiving apparatus can conveniently determine a phase rotation coefficient.

In a possible design, the related information of the M coefficients includes the coefficient index value; or at least one of the value of L, the value of M, the value information of the sequences in the M symbol sequences sent by the transmit end, and the time-frequency resource information of the M symbol sequences. The receiving apparatus determines the phase rotation coefficient in a plurality of manners.

According to a third aspect, a specific embodiment of the present invention provides a transmitting apparatus, including a processor and a transceiver. The processor is configured to multiply M first symbol sequences by M coefficients respectively to obtain M second symbol sequences, where M is a positive integer greater than 1, the symbol sequence includes L symbols, L is a positive integer greater than 1, and the M coefficients each have a magnitude of 1. The processor is further configured to map the M second symbol sequences onto a first time-frequency resource to obtain a frequency domain signal. The processor is further configured to perform an inverse fast Fourier transform IFFT operation on the frequency domain signal to obtain a time domain signal. The transceiver is configured to send the time domain signal. A reference signal is split into a plurality of symbol sequences, and phase rotation is performed for the plurality of symbol sequences. This effectively reduces a PAPR/an RCM during transmission of the reference signal while ensuring orthogonality of the reference signal.

In a possible design, the processor is further configured to determine the M coefficients.

In a possible design, that the processor is configured to determine the M coefficients specifically includes: determining the M coefficients based on at least one of a value of L, a value of M, value information of sequences in the M first symbol sequences, and information about the first time-frequency resource. The M coefficients are determined in a plurality of manners, so as to reduce the PAPR/RCM during transmission of the reference signal.

In a possible design, the processor is further configured to send a control message, where the control message includes related information of the M coefficients, and the related information of the M coefficients is used by a receiving apparatus to determine the M coefficients. The control message is sent to the receiving apparatus, so that the receiving apparatus can conveniently determine a phase rotation coefficient.

In a possible design, the related information of the M coefficients includes a coefficient index value; or at least one of the value of L, the value of M, and the value information of the sequences in the M first symbol sequences. The receiving apparatus determines the phase rotation coefficient in a plurality of manners.

In a possible design, the control message further includes related information of the first time-frequency resource, and the related information of the first time-frequency resource is used to indicate a location of the first time-frequency resource. The related information of the first time-frequency resource is sent to the receiving apparatus, so that the receiving apparatus can determine the phase rotation coefficient.

In a possible design, that the processor maps the M second symbol sequences onto a first time-frequency resource specifically includes at least one of the following mapping manners: sequentially mapping the symbols in the M second symbol sequences onto resource elements RE of consecutive frequencies; or mapping the symbols in the M second symbol sequences onto REs of consecutive frequencies in an interleaving manner; or mapping the symbols in the M second symbol sequences onto REs of consecutive frequencies in a spaced manner, where the spaced manner specifically includes mapping different symbols in a same second symbol sequence onto REs of consecutive frequencies, and mapping different second symbol sequences onto REs of frequencies with a fixed spacing. The second symbol sequences are mapped onto the first time-frequency resource in a plurality of manners.

In a possible design, the value of L is an integer multiple of a quantity of resource elements RE included in a resource block RB.

According to a fourth aspect, a specific embodiment of the present invention provides a receiving apparatus. The receiving apparatus includes a transceiver and a processor. The transceiver is configured to receive a time domain signal. The processor is configured to: perform a fast Fourier transform FFT operation on the time domain signal to obtain a frequency domain signal; determine a time-frequency location of a reference signal; split the received reference signal into blocks based on a length of L to obtain N third symbol sequences, where a length of each symbol sequence in the N third symbol sequences is L, and N and L both are positive integers greater than 1; divide the N third symbol sequences by N coefficients respectively to obtain N fourth symbol sequences, where the N coefficients each have a magnitude of 1; and perform at least one operation of channel estimation and channel quality measurement by using the N fourth symbol sequences. The reference signal is split into a plurality of symbol sequences, and phase rotation is performed for the plurality of symbol sequences. This effectively reduces a PAPR/an RCM during transmission of the reference signal while ensuring orthogonality of the reference signal.

In a possible design, the processor is further configured to determine the N coefficients.

In a possible design, the determining the N coefficients specifically includes: determining M coefficients, where M is a quantity of second symbol sequences with a length of L that are transmitted by a transmit end, M is a positive integer greater than or equal to N, and N second symbol sequences in the M second symbol sequences are sent to the receiving device; and determining the N coefficients based on the M coefficients and locations of the N second symbol sequences in the M second symbol sequences. The N coefficients are determined in a plurality of manners.

In a possible design, the determining the M coefficients specifically includes: determining the M coefficients based on a coefficient index value; or determining the M coefficients based on at least one of a value of L, a value of M, value information of sequences in the M symbol sequences sent by the transmit end, and time-frequency resource information of the M symbol sequences. The M coefficients are determined in a plurality of manners.

In a possible design, the transceiver is further configured to receive a control message, where the control message includes related information of the M coefficients. The control message is sent to the receiving apparatus, so that the receiving apparatus can conveniently determine a phase rotation coefficient.

In a possible design, the related information of the M coefficients includes the coefficient index value; or at least one of the value of L, the value of M, the value information of the sequences in the M symbol sequences sent by the transmit end, and the time-frequency resource information of the M symbol sequences. The receiving apparatus determines the phase rotation coefficient in a plurality of manners.

According to a fifth aspect, a specific embodiment of the present invention provides a transmitting apparatus, including a processing unit and a transceiving unit. The processing unit is configured to multiply M first symbol sequences by M coefficients respectively to obtain M second symbol sequences, where M is a positive integer greater than 1, the symbol sequence includes L symbols, L is a positive integer greater than 1, and the M coefficients each have a magnitude of 1. The processing unit is further configured to map the M second symbol sequences onto a first time-frequency resource to obtain a frequency domain signal. The processing unit is further configured to perform an inverse fast Fourier transform IFFT operation on the frequency domain signal to obtain a time domain signal. The transceiving unit is configured to send the time domain signal. A reference signal is split into a plurality of symbol sequences, and phase rotation is performed for the plurality of symbol sequences. This effectively reduces a PAPR/an RCM during transmission of the reference signal while ensuring orthogonality of the reference signal.

In a possible design, the processing unit is further configured to determine the M coefficients.

In a possible design, that the processing unit is configured to determine the M coefficients specifically includes: determining the M coefficients based on at least one of a value of L, a value of M, value information of sequences in the M first symbol sequences, and information about the first time-frequency resource. The M coefficients are determined in a plurality of manners, so as to ensure a minimum PAPR/RCM during transmission of each symbol sequence.

In a possible design, the processing unit is further configured to send a control message, where the control message includes related information of the M coefficients, and the related information of the M coefficients is used by a receiving apparatus to determine the M coefficients. The control message is sent to the receiving apparatus, so that the receiving apparatus can conveniently determine a phase rotation coefficient.

In a possible design, the related information of the M coefficients includes a coefficient index value; or at least one of the value of L, the value of M, and the value information of the sequences in the M first symbol sequences. The receiving apparatus determines the phase rotation coefficient in a plurality of manners.

In a possible design, the control message further includes related information of the first time-frequency resource, and the related information of the first time-frequency resource is used to indicate a location of the first time-frequency resource. The related information of the first time-frequency resource is sent to the receiving apparatus, so that the receiving apparatus can determine the phase rotation coefficient.

In a possible design, that the processing unit maps the M second symbol sequences onto a first time-frequency resource specifically includes at least one of the following mapping manners: sequentially mapping the symbols in the M second symbol sequences onto resource elements RE of consecutive frequencies; or mapping the symbols in the M second symbol sequences onto REs of consecutive frequencies in an interleaving manner; or mapping the symbols in the M second symbol sequences onto REs of consecutive frequencies in a spaced manner, where the spaced manner specifically includes mapping different symbols in a same second symbol sequence onto REs of consecutive frequencies, and mapping different second symbol sequences onto REs of frequencies with a fixed spacing. The second symbol sequences are mapped onto the first time-frequency resource in a plurality of manners.

In a possible design, the value of L is an integer multiple of a quantity of resource elements RE included in a resource block RB.

According to a sixth aspect, a specific embodiment of the present invention provides a receiving apparatus, including a transceiving unit and a processing unit. The transceiving unit is configured to receive a time domain signal. The processing unit is configured to perform a fast Fourier transform FFT operation on the time domain signal to obtain a frequency domain signal. The processing unit is further configured to determine a time-frequency location of a reference signal. The processing unit is further configured to split the received reference signal into blocks based on a length of L to obtain N third symbol sequences, where a length of each symbol sequence in the N third symbol sequences is L, and N and L both are positive integers greater than 1. The processing unit is further configured to divide the N third symbol sequences by N coefficients respectively to obtain N fourth symbol sequences, where the N coefficients each have a magnitude of 1. The processing unit is further configured to perform at least one operation of channel estimation and channel quality measurement by using the N fourth symbol sequences. The reference signal is split into a plurality of symbol sequences, and phase rotation is performed for the plurality of symbol sequences.

This effectively reduces a PAPR/an RCM during transmission of the reference signal while ensuring orthogonality of the reference signal.

In a possible design, the processing unit is further configured to determine the N coefficients.

In a possible design, the determining the N coefficients specifically includes: determining M coefficients, where M is a quantity of second symbol sequences with a length of L that are transmitted by a transmit end, M is a positive integer greater than or equal to N, and N second symbol sequences in the M second symbol sequences are sent to the receiving device; and determining the N coefficients based on the M coefficients and locations of the N second symbol sequences in the M second symbol sequences. The N coefficients are determined in a plurality of manners.

In a possible design, the determining the M coefficients specifically includes: determining the M coefficients based on a coefficient index value; or determining the M coefficients based on at least one of a value of L, a value of M, value information of sequences in the M symbol sequences sent by the transmit end, and time-frequency resource information of the M symbol sequences. The M coefficients are determined in a plurality of manners.

In a possible design, the transceiving unit is further configured to receive a control message, where the control message includes related information of the M coefficients. The control message is sent to the receiving apparatus, so that the receiving apparatus can conveniently determine a phase rotation coefficient.

In a possible design, the related information of the M coefficients includes the coefficient index value; or at least one of the value of L, the value of M, the value information of the sequences in the M symbol sequences sent by the transmit end, and the time-frequency resource information of the M symbol sequences. The receiving apparatus determines the phase rotation coefficient in a plurality of manners.

According to the reference signal transmission method and the apparatus in the embodiments of the present invention, a reference signal is into a plurality of symbol sequences, each symbol sequence is multiplied by a coefficient to perform phase rotation, and a plurality of symbol sequences with a phase rotated are sent. The reference signal is split into the plurality of symbol sequences, and phase rotation is performed for the plurality of symbol sequences. This effectively reduces a PAPR/an RCM during transmission of the reference signal while ensuring orthogonality of the reference signal.

DESCRIPTION OF EMBODIMENTS

The technical solutions in embodiments of the present invention are further described in detail below with reference to the accompanying drawings and the embodiments.

The present invention provides a reference signal transmission method, and the method may be used in an existing LTE system, a future 4.5G system, and a new radio (NR) system. A to-be-transmitted RS is transmitted after the to-be-transmitted RS is split into blocks and phase rotation is performed for the to-be-transmitted RS. This can implement low PAPR/RCM performance while ensuring orthogonality of RSs of different transmitting apparatuses or RS blocks of different types of/different antenna ports of a same transmitting apparatus. The reference signal transmission method may be used in scenarios, such as uplink data transmission in the existing LTE system, uplink data transmission in the future 4.5G system, and uplink data transmission in a future 5G system, to improve uplink coverage. Because RSs of a plurality of user equipments (UE) are orthogonal to each other, the reference signal transmission method is also applicable to scenarios such as a grant-free scenario and a scenario in which a plurality of UEs supporting a symbol-level TTI share an RS symbol. The reference signal transmission method may also be used in scenarios such as downlink data transmission in the LTE system and downlink data transmission in the future 5G system.

A transmitting apparatus and a receiving apparatus in the embodiments of the present invention may be any transmitting apparatus and receiving apparatus that transmit data in a wireless manner. The transmitting apparatus and the receiving apparatus may be any apparatus with wireless transmitting and receiving functions. The apparatus includes but is not limited to a NodeB, an evolved NodeB (eNodeB), a gNodeB in a future fifth generation (5G) communications system, an access node in a WiFi system, a wireless relay node, a wireless backhaul node, and UE. The UE may also be referred to as a terminal, a mobile station (MS), a mobile terminal (MT), and the like. The UE may communicate with one or more core networks through a radio access network (RAN), and the UE may also directly perform wireless communication with another UE.

The embodiments of the present invention may be applied to scenarios, such as downlink data transmission, uplink data transmission, device-to-device (D2D) data transmission, and wireless backhaul data transmission in a wireless communications system. The embodiments of the present invention impose no limitation on an application scenario.

Figure 1:
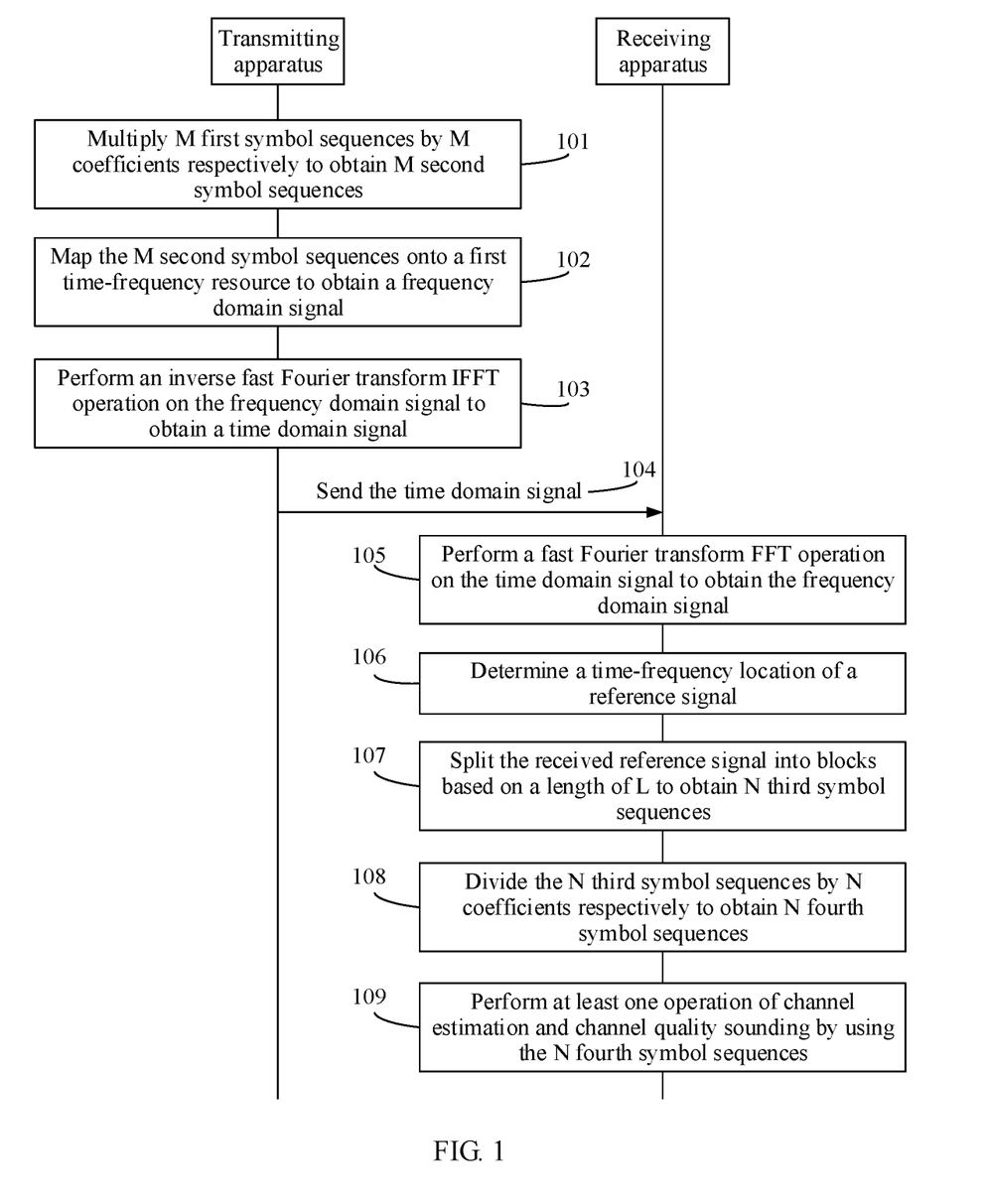
FIG. 1 is a flowchart of a reference signal transmission method according to an embodiment of the present invention.

FIG. 1 is a flowchart of a reference signal transmission method according to an embodiment of the present invention.

S101: A transmitting apparatus multiplies M first symbol sequences by M coefficients respectively to obtain M second symbol sequences.

Specifically, the transmitting apparatus splits a reference signal into blocks based on a length of L, that is, splits the reference signal into the M first symbol sequences with the length of L. M and L both are positive integers greater than 1. The M symbol sequences may be same sequences or different sequences, and specifically, each may be any one of a ZC (Zadoff-Chu) sequence, a pseudo-random sequence, or a Golay sequence, or may be another sequence. This is not limited in this embodiment of the present invention. It should be noted that in this application, a symbol in a symbol sequence is a symbol whose information bit has been modulated, for example, a binary phase shift keying (BPSK) symbol, a quadrature phase shift keying (QPSK) symbol, a 16 quadrature amplitude modulation (QAM) symbol, a 64 QAM symbol, or a 256 QAM symbol. Further, the transmitting apparatus multiplies the M first symbol sequences by the M coefficients respectively to obtain the M second symbol sequences, and the M coefficients each have a magnitude of 1. It can be understood that multiplying the M first symbol sequences by the M coefficients with the magnitude of 1 respectively is equivalent to separately performing phase rotation for the M first symbol sequences.

Before performing phase rotation for the M first symbol sequences, the transmitting apparatus may first determine the M coefficients. Specifically, the M coefficients may be determined based on at least one of a value of L, a value of M, value information of sequences in the M first symbol sequences, and information about a time-frequency resource onto which the second symbol sequence is mapped.

In a solution, a phase rotation coefficient of a symbol sequence may be determined through actual calculation by using the following formula:

$$b_1, b_2, \ldots, b_{M-1} = \arg\min_{b_1, b_2, \ldots, b_{M-1} \in P} \text{PAPR}\{y(n)\}, \text{ or}$$

$$b_1, b_2, \ldots, b_{M-1} = \arg\min_{b_1, b_2, \ldots, b_{M-1} \in P} \text{RCM}\{y(n)\}$$

The formula is used to indicate selecting, from a set, a coefficient making a minimum PAPR or RCM for each of $b_1$ to $b_{m-1}$ symbol sequences.

In the method, a rotation angle set is included, and the set includes a plurality of coefficients with a magnitude of 1. For example, in a set including four coefficients, the four coefficients are complex numbers with a magnitude of 1, and are respectively $\{1, i, -1, -i\}$. The coefficient 1 indicates an angle of 0 degrees, the coefficient i indicates an angle of 90 degrees, the coefficient $-1$ indicates an angle of 180 degrees, and the coefficient $-i$ indicates an angle of 270 degrees.

A first symbol sequence is multiplied by each rotation angle in the rotation angle set, to obtain a plurality of second symbol sequences with a phase rotated. For example, if the first symbol sequence includes M first symbol sequences, and the rotation angle set includes four rotation angles, each first symbol sequence includes four second symbol sequences with a phase rotated. A second symbol sequence that is generated after phase rotation and whose time domain signal has a minimum PAPR/RCM is determined from the four second symbol sequences. A coefficient by which this second symbol sequence is multiplied after phase rotation is obtained. This coefficient is determined as the coefficient by which the symbol sequence is multiplied during phase rotation.

Further, in the method, the transmitting apparatus may further include a stored phase rotation coefficient table. The transmitting apparatus may determine, based on at least one of the length of each first symbol sequence, the quantity M of first symbol sequences, sequences in the first symbol sequences, and time-frequency resource location information of the M symbol sequences, a coefficient used for phase rotation for each first symbol sequence from the phase rotation coefficient table.

Figure 2:
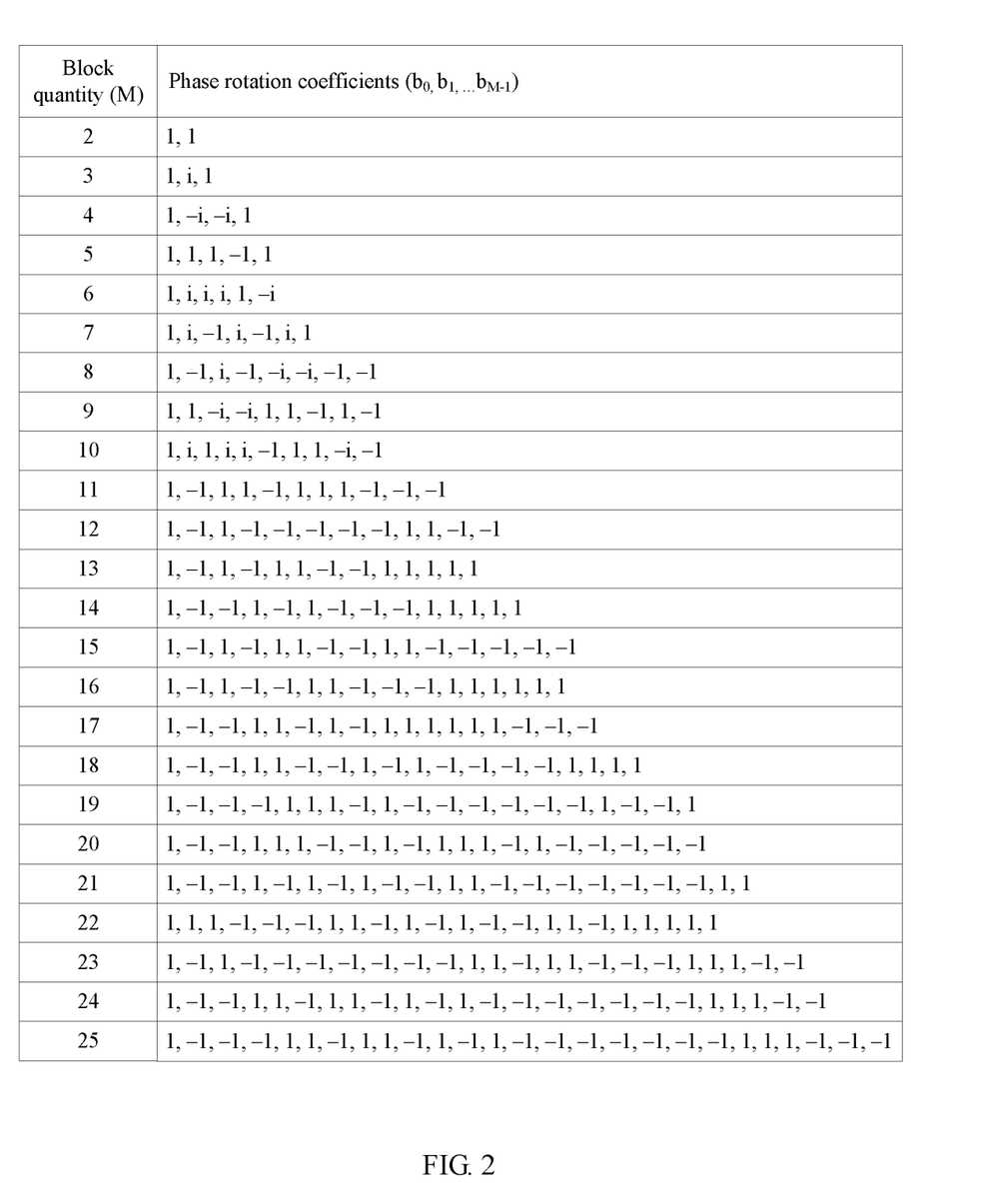
FIG. 2 is a phase rotation coefficient table according to a specific embodiment of the present invention.

In an example of a phase rotation coefficient table, FIG. 2 is a phase rotation coefficient table according to a specific embodiment of the present invention. As shown in FIG. 2, if a ZC sequence is fixedly used as a pilot sequence, and a fixed length of a first symbol sequence is 48, that is, one first symbol sequence is corresponding to four resource blocks (RB), and each RB includes 12 resource elements (RE), and a bandwidth of an LTE system is 20M, a value of a quantity of blocks ranges from 1 to 25. It is assumed that a coefficient factor value set P is $\{1, i, -1, -i\}$, and all blocks use a same pilot sequence (for example, a same cyclic shift of a same ZC sequence). Then possible relatively proper coefficient values for different block quantity configurations are shown in FIG. 2.

For example, a length of a reference signal is 16 RBs. When the reference signal is split into blocks, every four RBs form one first symbol sequence. The reference signal is split into four first symbol sequences, and each first symbol sequence is a ZC sequence. Therefore, when phase rotation is performed for the first symbol sequences, coefficient factors $(1, -i, -i, 1)$ for a block quantity (M) 4 is determined from FIG. 2 based on the four first symbol sequences obtained after splitting. A $1^{st}$ first symbol sequence is multiplied by 1, a $2^{nd}$ first symbol sequence is multiplied by $-i$, a $3^{rd}$ first symbol sequence is multiplied by $-i$, and a $4^{th}$ first symbol sequence is multiplied by 1. Each of the four first symbol sequences is multiplied by a coefficient, so as to complete phase rotation for the reference signal, and obtain four second symbol sequences.

It should be noted that the phase rotation coefficient table shown in FIG. 2 is merely an example of the specific embodiment of the present invention, but is not used for limiting the present invention. In different cases, for example, different sequences or different lengths of symbol sequences are used, different phase rotation coefficient tables may be generated. Moreover, a coefficient may not only have one of the foregoing values, and there may be a plurality of phase values that can also achieve similar performance. For example, a same value range has a plurality of optimal phase values or phase values that can achieve similar performance, and the optimal phase values or the phase values that can achieve similar performance may also change after the value range changes.

In the specific embodiment of the present invention, for an MU-MIMO system, for example, for a TM7, TM8, or TM9 transmission mode in 5G or LTE, before phase rotation is performed for a demodulation reference signal (DMRS), the method may further include: introducing a precoding matrix.

In a specific example, the precoding matrix and phase rotation are processed as two parts. First, an optimal precoding matrix is selected based on a channel condition. The precoding matrix is multiplied by a first symbol sequence of the DMRS to obtain a new symbol sequence. Then the new first symbol sequence is multiplied by a determined phase rotation coefficient to obtain a second symbol sequence with a phase rotated.

In a specific embodiment of the present invention, the precoding matrix may be at a subband level or a broadband level. When a broadband-level precoding matrix is used, that is, a same precoding matrix is used for data/symbol sequences on an OFDM symbol, a phase rotation coefficient may be determined according to the foregoing manner of determining the phase rotation coefficient of the first symbol sequence through actual calculation in the present invention, or may be determined according to the foregoing manner of determining the phase rotation coefficient of each first symbol sequence from the phase rotation coefficient included in the transmitting apparatus in the present invention.

When a subband-level precoding matrix is used, a size of a subband is an integer multiple of a size of the first symbol sequence. For example, one subband is one first symbol sequence, or one subband is two first symbol sequences. When subband-level precoding is used, each subband is multiplied by one precode. The precodes by which the subbands are multiplied may be the same or may be different. A phase rotation coefficient may be determined according to the foregoing manner of determining the phase rotation coefficient of the first symbol sequence through actual calculation in the present invention, or may be determined according to the foregoing manner of determining the phase rotation coefficient of the first symbol sequence from the phase rotation coefficient included in the transmitting apparatus in the present invention.

In another specific example, the precoding matrix and the phase rotation coefficient are optimized as a whole. To be specific, during selection of the precoding matrix, impact of the precoding matrix on a PAPR/an RCM of reference signal is considered, and a precoding matrix whose reference signal has a minimum PAPR/RCM is selected. When the precoding matrix is determined, a phase rotation coefficient is calculated. The phase rotation coefficient and the precoding matrix are merged to obtain a precoding matrix including phase rotation. The precoding matrix including phase rotation is multiplied by the first symbol sequence to obtain the second symbol sequence.

S102: Map the M second symbol sequences onto a first time-frequency resource to obtain a frequency domain signal.

The second symbol sequences, data information, and control information are mapped onto resource elements REs based on mapping relationship information of a time-frequency resource to obtain a frequency domain resource.

The reference signal may be mapped onto the resource elements REs in any of consecutive mapping, interleaved mapping, equally spaced mapping, or another mapping manner.

Figure 3:
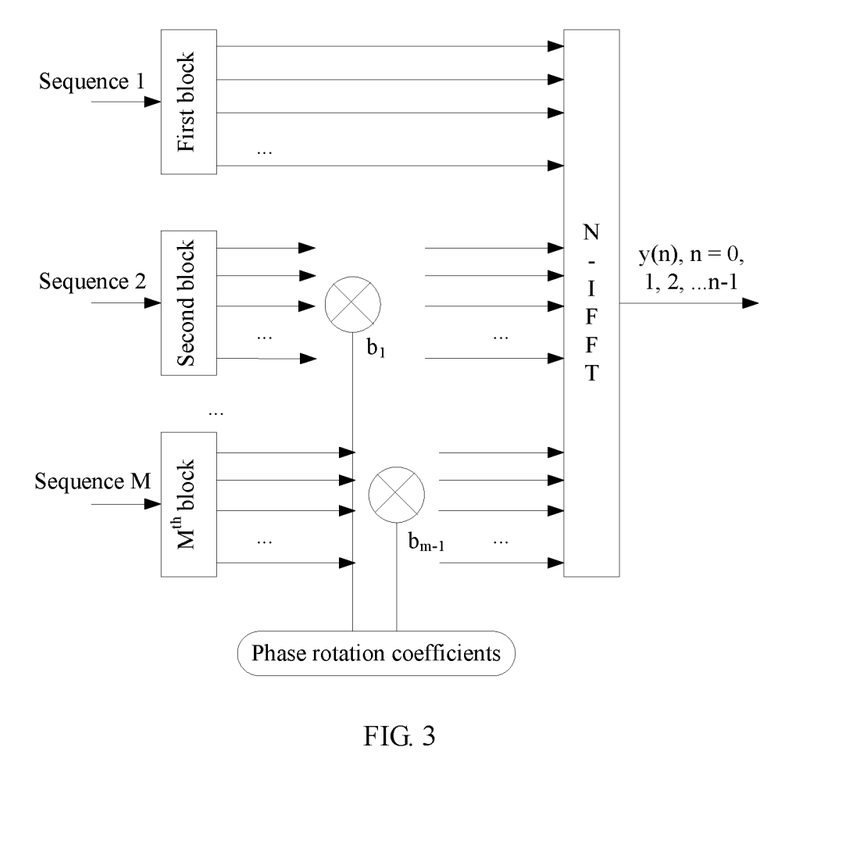
FIG. 3 is a schematic diagram of consecutive mapping according to a specific embodiment of the present invention.

FIG. 3 is a schematic diagram of consecutive mapping according to a specific embodiment of the present invention. As shown in FIG. 3, consecutive mapping is to sequentially map M second symbol sequences onto REs of consecutive frequencies.

Figure 4:
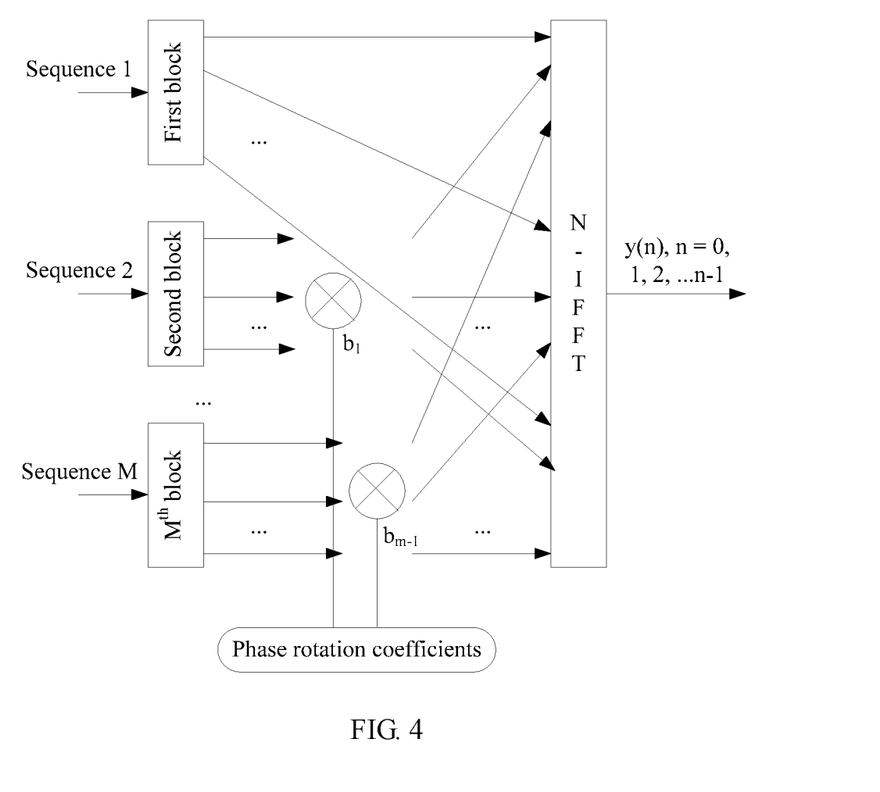
FIG. 4 is a schematic diagram of interleaved mapping according to a specific embodiment of the present invention.

FIG. 4 is a schematic diagram of interleaved mapping according to a specific embodiment of the present invention. As shown in FIG. 4, interleaved mapping is to map second symbol sequences onto REs of consecutive frequencies in an interleaving manner. A possible implementation is as follows: When a reference signal includes M second symbol sequences, a first symbol of a $1^{st}$ second symbol sequence is mapped onto a first RE, a first symbol of a $2^{nd}$ second symbol sequence is mapped onto a second RE, and so on, until a first symbol of an $M^{th}$ second symbol sequence is mapped onto an $M^{th}$ RE. Then a second symbol of the $2^{nd}$ second symbol sequence is mapped onto an $(M+1)^{th}$ RE and so on, until an $L^{th}$ symbol of the $M^{th}$ second symbol sequence is mapped onto an $(M*L)^{th}$ RE.

Figure 5:
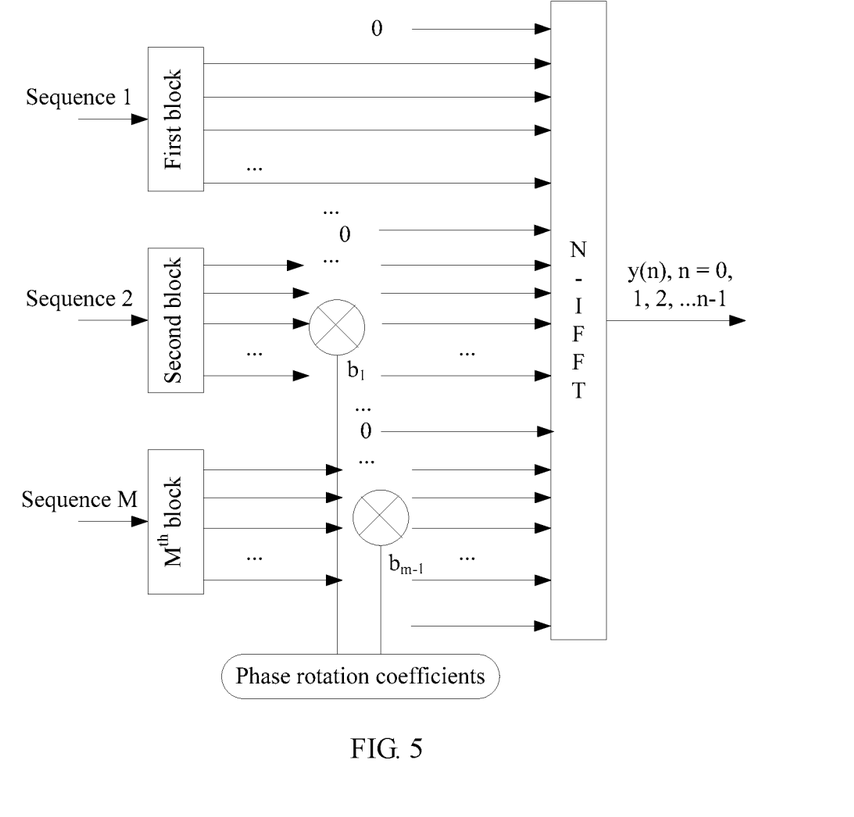
FIG. 5 is a schematic diagram of equally spaced mapping according to a specific embodiment of the present invention.

FIG. 5 is a schematic diagram of equally spaced mapping according to a specific embodiment of the present invention. As shown in FIG. 5, equally spaced mapping is to map a plurality of second symbol sequences onto REs of consecutive frequencies in an equally spaced manner. The equally spaced manner specifically includes mapping different symbols in a same second symbol sequence onto REs of consecutive frequencies, and mapping different second symbol sequences onto REs of frequencies with a fixed spacing.

For example, when a reference signal includes four second symbol sequences, and each second symbol sequence includes four symbols, four symbols in a $1^{st}$ second symbol sequence are mapped onto REs of consecutive frequencies. After a spacing of a quantity of REs, for example, a spacing of two idle REs, four symbols in a $2^{nd}$ second symbol sequence are mapped. According to the foregoing method, after mapping of the $2^{nd}$ second symbol sequence is completed, a $3^{rd}$ second symbol sequence is mapped after a spacing of two REs, and a $4^{th}$ second symbol sequence is mapped after a spacing of another two idle REs. Two spaced REs each may not carry a signal, or may carry another data symbol or pilot symbol.

Figure 6:
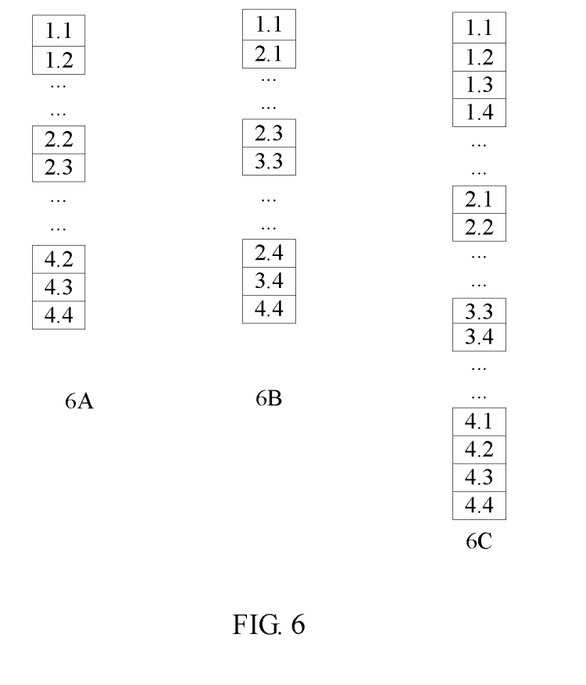
FIG. 6 shows a reference signal obtained after mapping according to a specific embodiment of the present invention.

FIG. 6 shows a reference signal obtained after mapping according to a specific embodiment of the present invention. The reference signal includes four second symbol sequences, and each second symbol sequence includes four symbols. A first sequence includes 1.1, 1.2, 1.3, and 1.4; a second sequence includes 2.1, 2.2, 2.3, and 2.4; a third sequence includes 3.1, 3.2, 3.3, and 3.4; and a fourth sequence includes 4.1, 4.2, 4.3, and 4.4.

FIG. 6A shows a reference signal obtained after consecutive mapping is used. As shown in FIG. 6A, during consecutive mapping, 2.1, 2.2, 2.3, and 2.4 in the second sequence are mapped after mapping of 1.1, 1.2, 1.3, and 1.4 in the first sequence is completed. Then the third sequence and the fourth sequence are mapped.

FIG. 6B shows a reference signal obtained after interleaved mapping is used. As shown in FIG. 6B, during interleaved mapping, after mapping of 1.1 in the first sequence is completed, 2.1 in the second sequence, 3.1 in the third sequence, and 4.1 in the fourth sequence are mapped. After mapping of the first symbol in each sequence is completed, 1.2 in the first sequence is mapped, and 2.2 in the second sequence, 3.2 in the third sequence, and 4.2 in the fourth sequence are mapped. According to the foregoing rule, 3.4 in the third sequence and 4.4 in the fourth sequence are finally mapped, to complete mapping of the entire sequences.

FIG. 6C shows a reference signal obtained after equally spaced mapping is used. As shown in FIG. 6C, during equally spaced mapping, after mapping of 1.1, 1.2, 1.3, and 1.4 in the first sequence is completed, a fixed spacing is left, for example, a spacing of two REs is left. Then the second sequence is mapped on to a seventh RE. After mapping of 2.1, 2.2, 2.3, and 2.4 in the second sequence is completed, another spacing of two REs is left. Mapping is performed according to the foregoing method until all the four second symbol sequences of the reference signal are mapped.

It can be understood that the foregoing mapping methods may also be combined. For example, interleaved mapping may be performed within a same symbol sequence, that is, intra-block interleaving in which different symbols in a same symbol sequence are mapped onto REs of consecutive frequencies in the interleaved manner, and different symbol sequences are mapped onto REs of consecutive frequencies; or interleaved mapping is performed within a same symbol sequence, and different symbol sequences are mapped onto REs of frequencies with a fixed spacing; or different symbols in a same symbol sequence are mapped onto REs of frequencies with a first frequency spacing, and different symbol sequences are mapped onto REs of frequencies with a second frequency spacing, where the first frequency spacing and the second frequency spacing may be the same or may be different. A possible intra-block interleaved mapping manner is further splitting a symbol sequence into a plurality of blocks, and then completing intra-block interleaved mapping by referring to the interleaved mapping method shown in FIG. 6.

S103: Perform an inverse fast Fourier transform IFFT operation on the frequency domain signal to obtain a time domain signal.

The inverse fast Fourier transform (IFFT) operation is performed on a mapped-to time-frequency resource to obtain the time domain signal.

S104: Send the time domain signal.

The transmitting apparatus sends the time domain signal.

In a possible embodiment of the present invention, the transmitting apparatus further sends a control message to a receiving apparatus. The control message includes related information of the M coefficients, and the related information of the M coefficients is used by the receiving apparatus to determine the M coefficients.

In an example, related information of the phase rotation coefficients of the M symbol sequences may be the phase rotation coefficients of the plurality of symbol sequences. Related information of the phase rotation coefficients of the M symbol sequences may alternatively be phase rotation index information of the plurality of symbol sequences. The index information may be block quantity information of the symbol sequences. Related information of the phase rotation coefficients of the M symbol sequences may alternatively be at least one of the value of L, the value of M, and the value information of the sequences in the M first symbol sequences.

Further, the control message further includes related information of the first time-frequency resource, and the related information of the first time-frequency resource is used to indicate a time-frequency location of the first time-frequency resource.

The receiving apparatus receives the time domain signal sent by the transmitting apparatus.

S105: Perform a fast Fourier transform FFT operation on the time domain signal to obtain the frequency domain signal.

The fast Fourier transform (FFT) operation is performed on the received time domain signal to obtain the frequency domain signal.

S106: Determine a time-frequency location of a reference signal.

The time-frequency location of the reference signal is determined to obtain a location of the reference signal on a resource element RE. The frequency domain signal is demapped to obtain the reference signal.

S107: Split the received reference signal into blocks based on a length of L to obtain N third symbol sequences.

Specifically, the receiving apparatus splits the reference signal into blocks based on the length of L, that is, splits the reference signal into N third symbol sequences with the length of L. N and L both are positive integers greater than 1.

For downlink data transmission, a base station may simultaneously send a pilot signal to a plurality of UEs. The base station sends M second symbol sequences with a length of L that are of the reference signal, and M is a positive integer greater than or equal to N. However, for a specific UE, only N symbol sequences in the M second symbol sequences may be sent to the UE. For uplink data transmission, the UE sends the M second symbol sequences, and all the M second symbol sequences are sent to the base station. Therefore, M is equal to N in this scenario.

S108: Divide the N third symbol sequences by N coefficients respectively to obtain N fourth symbol sequences.

Further, the receiving apparatus divides the N third symbol sequences by the N coefficients respectively to obtain the N fourth symbol sequence. The N coefficients each have a magnitude of 1. It can be understood that dividing the N third symbol sequences by the coefficients with the magnitude of 1 is equivalent to separately performing inverse phase rotation for each of the N third symbol sequences.

It can be understood that dividing by a complex number A with a modulus of 1 in a complex number field is equivalent to multiplying by a conjugate complex number B of A. Therefore, the foregoing dividing by the N coefficients respectively may alternatively be implemented by multiplying by conjugate complex numbers of the N coefficients respectively. Similarly, in S101, multiplying by the M coefficients respectively may alternatively be implemented by dividing by conjugate complex numbers of the M coefficients respectively.

Before performing inverse phase rotation the foregoing N third symbol sequences, the receiving apparatus may first determine the N coefficients.

Further, before determining the N coefficients, the receiving apparatus may first determine the M coefficients. M is a quantity of symbol sequences with a length of L that are of the reference signal and that are transmitted by a transmit end, and M is a positive integer greater than or equal to N. N second symbol sequences in the M second symbol sequences are sent to the receiving device.

Specifically, the M coefficients may be determined based on a coefficient index value, or may be determined based on at least one of the value of L, the value of M, value information of sequences in the M symbol sequences sent by the transmit end, and time-frequency resource information of the M symbol sequences.

Optionally, the receiving apparatus further receives the control message sent by the transmitting apparatus. The control message includes the related information of the M coefficients. The related information of the M coefficients may include the coefficient index value, or include at least one of the value of L, the value of M, the value information of the sequences in the M symbol sequences sent by the transmit end, and the time-frequency resource information of the M symbol sequences.

After determining the M coefficients, the receiving apparatus may further determine the N coefficients based on the M coefficients and locations of the N second symbol sequences in the M second symbol sequences.

The receiving apparatus may further include a phase rotation coefficient table. The phase rotation coefficient table may be as shown in FIG. 2. Based on the coefficient index value received by the receiving apparatus, the receiving apparatus determines a phase rotation coefficient of each symbol sequence in the M symbol sequences from the phase rotation coefficient table, and further determines phase rotation coefficients of the N symbol sequences.

In a possible implementation, the receiving apparatus may determine a phase rotation coefficient of a symbol sequence through detection. Because each symbol sequence may be a predefined sequence (for example, a ZC sequence), the receiving apparatus may use a predefined sequence (which is, for example, also a ZC sequence) to perform related detection on an entire bandwidth in a unit of a length of one symbol sequence. If a peak value (an autocorrelation peak of a ZC sequence) is detected in a symbol sequence, it indicates that the symbol sequence has data being transmitted. If no autocorrelation peak is detected, it indicates that the transmit end does not use a resource of the symbol sequence.

It should be noted that when the receiving apparatus detects that a symbol sequence has a peak value, the receiving apparatus further needs to determine whether the symbol sequence is a current symbol sequence of the receiving apparatus. In a specific embodiment of the present invention, the receiving apparatus may determine, with reference to a current resource allocation indication of the receiving apparatus, whether the symbol sequence in which a peak value is detected is a symbol sequence of the current receiving apparatus. Specifically, for downlink data transmission, downlink control information (DCI) has an indication of a resource used by the receiving apparatus. A resource currently used by the receiving apparatus may be determined by parsing a resource allocation field of the DCI. For uplink data transmission, an uplink data transmission resource is allocated by a base station of the receiving apparatus, and therefore the base station of the receiving apparatus may know the resource used for data transmission.

By using this method, the receiving apparatus may determine a total quantity of symbol sequences sent by the transmit end and specific locations of symbol sequences required by the receiving apparatus.

In a specific embodiment of the present invention, the receiving apparatus further includes the phase rotation coefficient table shown in FIG. 2. The receiving apparatus obtains a specific phase rotation coefficient through content shown in Table 2 and based on the total quantity of symbol sequences sent by the transmit end and the specific locations of the symbol sequences required by the receiving apparatus.

S109: Perform at least one operation of channel estimation and channel quality measurement by using the N fourth symbol sequences.

The receiving apparatus performs channel estimation and/or channel measurement based on the N fourth symbol sequences.

Figure 7:
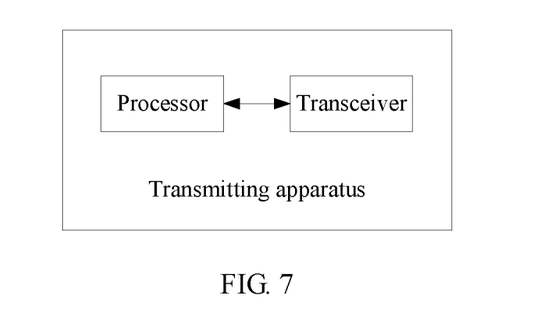
FIG. 7 is a schematic structural diagram of a reference signal transmitting apparatus according to a specific embodiment of the present invention.

FIG. 7 is a schematic structural diagram of a reference signal transmitting apparatus according to a specific embodiment of the present invention. As shown in FIG. 7, the transmitting apparatus includes a processor and a transceiver. The processor is configured to perform pilot generation, control channel signal generation, data generation, symbol sequence mapping, inverse fast Fourier transform, and symbol sequence phase rotation. In actual application, the processor may be further used in any other aspect. This is not limited in the present invention.

The processor is configured to provide a pilot generation control signal, and is configured to generate a reference signal through indication of the control signal, and split the reference signal into a plurality of RS blocks (symbol sequences).

The processor includes information for determining a symbol sequence length. A length of each symbol sequence is determined based on the symbol sequence length information. Lengths of the different symbol sequences help to split the reference signal RS into different quantities of RS blocks.

Phase rotation is performed for the symbol sequence by using a phase rotator. In the specific embodiment of the present invention, the performing phase rotation for the symbol sequence is multiplying the symbol sequence by a coefficient with a magnitude of 1. Based on coefficients by which the symbol sequence is multiplied, the symbol sequence is rotated by different phase angles.

In the specific embodiment of the present invention, the processor splits the reference signal into blocks, and multiplies the symbol sequence, obtained after splitting, by a coefficient to obtain a symbol sequence with a phase rotated. This is already described in detail in step S101, and details are not described herein again.

The processor maps the reference signal onto a first time-frequency resource to obtain a frequency domain signal, and maps a second symbol sequence, data information, and control information onto resource elements REs based on mapping relationship information of a time-frequency resource to obtain a frequency domain resource.

The reference signal may be mapped onto the resource elements REs in any of consecutive mapping, interleaved mapping, equally spaced mapping, or another mapping manner.

In the specific embodiment of the present invention, mapping a symbol sequence multiplied by a coefficient onto a time-frequency resource is already described in detail in step S102, and details are not described herein again.

The processor further performs an inverse fast Fourier transform (IFFT) operation on the frequency domain signal to obtain a time domain signal.

The transceiver sends the time domain signal.

In a possible embodiment of the present invention, the transmitting apparatus further sends a control message to a receiving apparatus. The control message includes related information of M coefficients, and the related information of the M coefficients is used by the receiving apparatus to determine the M coefficients.

In the specific embodiment of the present invention, the transceiver sends the time domain signal and sends the control message. This is already described in detail in step S104, and details are not described herein again.

Figure 8:
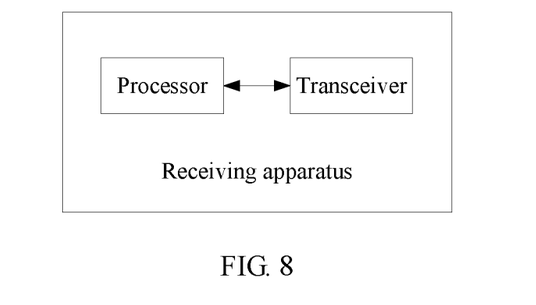
FIG. 8 is a schematic structural diagram of a reference signal receiving apparatus according to a specific embodiment of the present invention.

FIG. 8 is a schematic structural diagram of a reference signal receiving apparatus according to a specific embodiment of the present invention. As shown in FIG. 8, the receiving apparatus includes a transceiver and a processor. The transceiver is configured to receive a time domain signal sent by a transmitting apparatus. The processor is configured to perform an FFT operation, demapping, and inverse phase rotation. In actual application, processing work of the processor may be reduced or increased according to an actual requirement.

The transceiver receives the time domain signal shown in FIG. 1. The processor performs an fast Fourier transform (FFT) operation on the time domain signal received by the transceiver, to obtain a frequency domain signal.

A time-frequency location of a reference signal is determined to obtain a location of the reference signal on a resource element RE. The frequency domain signal is demapped to obtain the reference signal.

The processor further splits the reference signal into blocks based on a length to obtain a plurality of symbol sequences.

In the specific embodiment of the present invention, that the processor splits the reference signal into a plurality of blocks is already described in step S107, and details are not described herein again.

The processor further divides a symbol sequence by a phase rotation coefficient to perform inverse phase rotation, to obtain a symbol sequence with a phase inversely rotated.

In the specific embodiment of the present invention, dividing a symbol sequence by a phase rotation coefficient to perform inverse phase rotation is already described in step S108, and details are not described herein again.

The processor further performs channel estimation and/or channel measurement based on a symbol sequence with a phase rotated.

Figure 9:
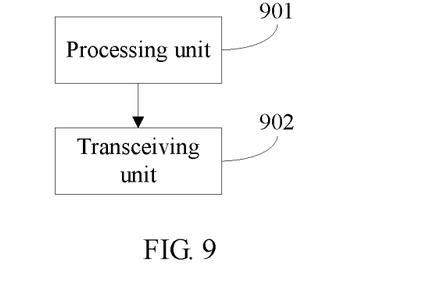
FIG. 9 shows a transmitting apparatus according to a specific embodiment of the present invention.

FIG. 9 shows a transmitting apparatus according to a specific embodiment of the present invention. The transmitting apparatus implements functions of the transmitting apparatus in the foregoing reference signal transmission method embodiment, and therefore can also implement beneficial effects of the foregoing reference signal transmission method. The functions of the transmitting apparatus may be implemented by hardware, or may be implemented by executing corresponding software by hardware. The hardware or the software includes at least one module corresponding to the foregoing functions. As shown in FIG. 9, the transmitting apparatus specifically includes a processing unit 901 and a transceiving unit 902.

The processing unit 901 is configured to multiply M first symbol sequences by M coefficients respectively to obtain M second symbol sequences, where M is a positive integer greater than 1, the symbol sequence includes L symbols, L is a positive integer greater than 1, and the M coefficients each have a magnitude of 1.

The processing unit 901 is further configured to map the M second symbol sequences onto a first time-frequency resource to obtain a frequency domain signal.

The processing unit 901 is further configured to perform an inverse fast Fourier transform IFFT operation on the frequency domain signal to obtain a time domain signal.

The transceiving unit 902 is configured to send the time domain signal.

For other functions of the processing unit 901 and the transceiving unit 902, refer to the processing procedure and the method in the foregoing reference signal transmission method embodiment. Details are not described herein again.

Figure 10:
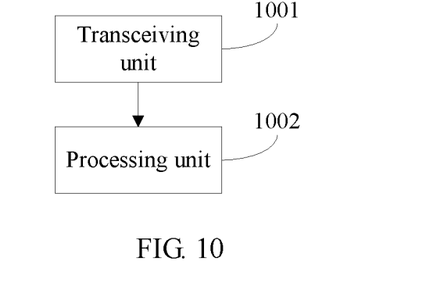
FIG. 10 shows a receiving apparatus according to a specific embodiment of the present invention.

FIG. 10 shows a receiving apparatus according to a specific embodiment of the present invention. The receiving apparatus implements functions of the receiving apparatus in the foregoing reference signal transmission method embodiment, and therefore can also implement beneficial effects of the foregoing reference signal transmission method. The functions of the receiving apparatus may be implemented by hardware, or may be implemented by executing corresponding software by hardware. The hardware or the software includes at least one module corresponding to the foregoing functions. As shown in FIG. 10, the receiving apparatus specifically includes a transceiving unit 1001 and a processing unit 1002.

The transceiving unit 1001 is configured to receive a time domain signal.

The processing unit 1002 is configured to perform a fast Fourier transform FFT operation on the time domain signal to obtain a frequency domain signal.

The processing unit 1002 is further configured to determine a time-frequency location of a reference signal.

The processing unit 1002 is further configured to split the received reference signal into blocks based on a length of L to obtain N third symbol sequences, where a length of each symbol sequence in the N third symbol sequences is L, and N and L both are positive integers greater than 1.

The processing unit 1002 is further configured to divide the N third symbol sequences by N coefficients respectively to obtain N fourth symbol sequences, where the N coefficients each have a magnitude of 1.

The processing unit 1002 is further configured to perform at least one operation of channel estimation and channel quality measurement by using the N fourth symbol sequences.

For other functions of the processing unit 1002 and the transceiving unit 1001, refer to the processing procedure and the method in the foregoing reference signal transmission method embodiment. Details are not described herein again.

A person skilled in the art may be further aware that, in combination with the examples described in the embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and beneficial effects of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention shall fall within the protection scope of the present invention.

What is claimed is:

1. A method, comprising:

multiplying M first symbol sequences by M coefficients respectively to obtain M second symbol sequences, wherein M is a positive integer greater than 1, each of the M first symbol sequences comprises L symbols, L is a positive integer greater than 1, and the M coefficients each has a magnitude of 1;

mapping the M second symbol sequences onto a first time-frequency resource to obtain a frequency domain signal;

performing an inverse fast Fourier transform (IFFT) operation on the frequency domain signal to obtain a time domain signal; and sending the time domain signal; and, wherein mapping the M second symbol sequences onto a first time-frequency resource comprises at least one of the following:

sequentially mapping the symbols in the M second symbol sequences onto resource elements (RE) of consecutive frequencies;

mapping the symbols in the M second symbol sequences onto REs of consecutive frequencies in an interleaving manner; or mapping the symbols in the M second symbol sequences onto REs of consecutive frequencies in a spaced manner, wherein the spaced manner specifically comprises mapping different symbols in a same symbol sequence onto REs of consecutive frequencies, and mapping different symbol sequences onto REs of frequencies with a spacing.

2. The method according to claim 1, further comprising: determining the M coefficients.

3. The method according to claim 2, wherein determining the M coefficients comprises:
   determining the M coefficients based on at least one of a value of L, a value of M, value information of sequences in the M first symbol sequences, or information about the first time-frequency resource.

4. The method according to claim 1, wherein the method further comprises:
   sending a control message, wherein the control message comprises related information of the M coefficients, and the related information of the M coefficients is used by a receiving apparatus to determine the M coefficients.

5. The method according to claim 4, wherein the related information of the M coefficients comprises:
   a coefficient index value; or
   at least one of the value of L, the value of M, and the value information of the sequences in the M first symbol sequences.

6. The method according to claim 4, wherein the control message further comprises related information of the first time-frequency resource, and the related information of the first time-frequency resource is used to indicate a time-frequency location of the first time-frequency resource.

7. The method according to claim 1, wherein the value of L is an integer multiple of a quantity of resource elements RE comprised in a resource block (RB).

8. A method, comprising:
   receiving a time domain signal;
   performing a fast Fourier transform (FFT) operation on the time domain signal to obtain a frequency domain signal;
   determining a time-frequency location of a reference signal;
   splitting the received reference signal into blocks based on a length of L to obtain N third symbol sequences, wherein a length of each symbol sequence in the N third symbol sequences is L, and N and L both are positive integers greater than 1;
   dividing the N third symbol sequences by N coefficients respectively to obtain N fourth symbol sequences, wherein the N coefficients each have a magnitude of 1; and
   performing at least one operation of channel estimation and channel quality measurement by using the N fourth symbol sequences.

9. The method according to claim 8, further comprising: determining the N coefficients.

10. The method according to claim 9, wherein determining the N coefficients comprises:
    determining M coefficients, wherein M is a quantity of symbol sequences with a length of L that are of the reference signal and that are transmitted by a transmit end, and M is a positive integer greater than or equal to N; and
    determining the N coefficients based on the M coefficients and locations of the N symbol sequences in the M symbol sequences.

11. The method according to claim 10, wherein determining the M coefficients comprises:
    determining the M coefficients based on a coefficient index value; or
    determining the M coefficients based on at least one of a value of L, a value of M, value information of sequences in the M symbol sequences sent by the transmit end, and time-frequency resource information of the M symbol sequences.

12. The method according to claim 11, wherein the method further comprises:
    receiving a control message, wherein the control message comprises related information of the M coefficients.

13. The method according to claim 12, wherein the related information of the M coefficients comprises:
    the coefficient index value; or
    at least one of the value of L, the value of M, the value information of the sequences in the M symbol sequences sent by the transmit end, and the time-frequency resource information of the M symbol sequences.

14. An apparatus, comprising:
    a processor; and
    a non-transitory memory coupled to the processor for storing program instructions,
    wherein the program instructions, when executed by the processor, cause the apparatus to:
    multiply M first symbol sequences by M coefficients respectively to obtain M second symbol sequences, wherein M is a positive integer greater than 1, each of the M first symbol sequences comprises L symbols, L is a positive integer greater than 1, and the M coefficients each has a magnitude of 1;
    map the M second symbol sequences onto a first time-frequency resource to obtain a frequency domain signal; and
    perform an inverse fast Fourier transform IFFT operation on the frequency domain signal to obtain a time domain signal; and
    send the time domain signal; and, wherein mapping the M second symbol sequences onto a first time-frequency resource comprises at least one of the following:
    sequentially mapping the symbols in the M second symbol sequences onto resource elements (RE) of consecutive frequencies;
    mapping the symbols in the M second symbol sequences onto REs of consecutive frequencies in an interleaving manner; or
    mapping the symbols in the M second symbol sequences onto REs of consecutive frequencies in a spaced manner, wherein the spaced manner specifically comprises mapping different symbols in a same symbol sequence onto REs of consecutive frequencies, and mapping different symbol sequences onto REs of frequencies with a spacing.

15. The apparatus according to claim 14, wherein the program instructions further cause the apparatus to:
    determine the M coefficients.

16. The apparatus according to claim 15, wherein the program instructions further cause the apparatus to:
    determine the M coefficients based on at least one of a value of L, a value of M, value information of sequences in the M first symbol sequences, and information about the first time-frequency resource.

17. The apparatus according to claim 14, wherein the program instructions further cause the apparatus to:
    send a control message, wherein the control message comprises related information of the M coefficients, and the related information of the M coefficients is used by a receiving apparatus to determine the M coefficients.

18. The apparatus according to claim 17, wherein the related information of the M coefficients comprises:
- a coefficient index value; or
- at least one of the value of L, the value of M, or the value information of the sequences in the M first symbol sequences.

19. The apparatus according to claim 17, wherein the control message further comprises related information of the first time-frequency resource, and the related information of the first time-frequency resource is used to indicate a location of the first time-frequency resource.

\* \* \* \* \*